United States Patent
Timmermans et al.

(10) Patent No.: US 7,555,617 B2
(45) Date of Patent: Jun. 30, 2009

(54) ELECTRONIC DATA PROCESSING DEVICE WITH SECURED MEMORY ACCESS

(75) Inventors: Peter Timmermans, Brussels (BE); Carl Van Himbeeck, Brussels (BE); Mark Vanophalvens, Brussels (BE)

(73) Assignee: ATOS Worldline SA, Brussels (BE)

( * ) Notice: Subject to any disclaimer, the term of this patent is extended or adjusted under 35 U.S.C. 154(b) by 745 days.

(21) Appl. No.: 11/008,934

(22) Filed: Dec. 13, 2004

(65) Prior Publication Data
US 2005/0200504 A1 Sep. 15, 2005

(30) Foreign Application Priority Data
Dec. 11, 2003 (EP) .................................. 03078879

(51) Int. Cl.
*G06F 13/00* (2006.01)
*G06F 13/16* (2006.01)

(52) U.S. Cl. .................. 711/154; 711/163; 711/170

(58) Field of Classification Search .................. 711/154, 711/163, 170
See application file for complete search history.

(56) References Cited

U.S. PATENT DOCUMENTS

| | | | | |
|---|---|---|---|---|
| 4,228,496 A * | 10/1980 | Katzman et al. | ............ | 710/100 |
| 4,660,168 A | 4/1987 | Grant et al. | | |
| 7,124,170 B1 * | 10/2006 | Sibert | ......................... | 709/216 |
| 2001/0052054 A1 | 12/2001 | Franke et al. | | |
| 2003/0018860 A1 | 1/2003 | Krueger | | |

FOREIGN PATENT DOCUMENTS

GB  1601956  11/1981

* cited by examiner

*Primary Examiner*—Hyung S Sough
*Assistant Examiner*—Mardochee Chery
(74) *Attorney, Agent, or Firm*—Novak Druce + Quigg LLP; Jerold I. Schneider

(57) ABSTRACT

An electronic data processing device includes a data processing member provided for controlling, based on first and second encoded data, a secured operation initiated by a user, a memory which is configurable in order to delimit at least one secured memory part within that memory, to each secured memory parts there being assigned a dedicated address range. The data processing member includes N ($N \geq 2$) processing units of which M ($M \leq N-1$) processing units are provided to process the secured operation and at least one of the remaining N-M processing units is provided for processing application data, to each of the M processing units there is assigned at least one of the secured memory parts via of a configuration element controlled by a selected one of the M processing units. The second memory is provided with a memory access controller provided for controlling access to the second memory. The memory controller is provided for detecting an access request to a protected memory address, belonging to those ranges, when issued by one of a N-M processing units and for overruling a detected protected address.

6 Claims, 3 Drawing Sheets

ELECTRONIC DATA PROCESSING DEVICE WITH SECURED MEMORY ACCESS

CROSS-REFERENCE TO RELATED APPLICATIONS

This application claims priority from European Application No. 03078879.8 filed 11 Dec. 2003, the disclosure of which is hereby incorporated by reference.

BACKGROUND

The invention relates to an electronic data processing device, comprising a data processing member, provided for processing first encoded data, obtained by encoding first data, input by a user and second encoded data, read from a carrier comprising a first memory for storing identification data, said data processing member being provided for controlling, based on said first and second data, a secured operation initiated by said user, said device further comprising a second memory accessible by said processing member, said second memory being configurable in order to delimit at least one secured memory part within said second memory, to each of said secured memory parts there being assigned a dedicated address range, said data processing member comprises N ($N\geq 2$) processing units of which M ($M\leq N-1$) processing units are provided to process said secured operation and at least one of the remaining N-M processing units is provided for processing application data related to said transfer, to each of said M processing units there is assigned at least one of said secured memory parts, each of said processing units being each time connected to a memory access control member by means of a dedicated internal bus, said second memory being also connected to said memory access control member, which is provided for controlling accesses to said second memory, said memory access control member being provided for storing said memory address ranges assigned to said M processing units and for detecting an access request to said protected memory address, belonging to said ranges, when issued by one of said N-M processing units and for overruling the detected protected address.

Such an electronic data processing device is known from US-A-2003/0018860 and for example used as a transfer terminal for electronic payment placed at a point of sales. The first data is generally input by the user by means of keys or a touch screen and comprises for example the user's PIN code. The second data is stored in the first memory of the carrier, for example a bankcard and identifies the user, for example by his bank account number. Since the PIN code as well as the bank account number are secured data, they should only be processed by a secured operation, which is initiated by the user upon introducing the carrier with his first memory into the terminal. For the execution of the transaction requested by the user, and in particular for the secured operation, the data processing member needs the second memory, where the necessary routines and data, as well as encoding and decoding keys are stored.

As secured operations are executed by the processing member, it is of the utmost importance that the data involved in such an operation are well protected against any attempt to read or retrieve them. For that purpose it is well known to encrypt or encode the data involved in the secured operation and avoid in such a manner that "clear" data could be retrieved from the terminal.

Unfortunately, it is not excluded that persons with bad intentions could reach the keys stored in the second memory and could thus be able to decode the data encoded by means of those keys. Still higher levels of protection are thus required in order to provide the user with an efficient and reliable protection of the secured operation initiated on such electronic data processing devices.

In the device known from US-A-2003/0018860 a plurality of processing units are present and only a restricted number of them is entitled to process secure data. In order to avoid that processing units, which are not entitled to access secure data, could reach this secure data, a memory access control member is used. This memory access control member is provided with an SPM (System Protection Member), which is connected to a traffic control unit. The SPM controls the traffic towards the second memory and prevents that secure data is accessed by non-authorised processing units.

A drawback of the known device is that the SPM monitors a common bus, which is accessible by all processing units. This signifies that one could, via this common bus, get access to the SPM and reconfigure the latter, in order to get access to the secure data.

SUMMARY

It is an object of the present invention to increase the protection of such an electronic data processing device, while preventing access to the security tools.

For this purpose an electronic data processing device according to the present invention is characterised in that said memory access control member comprises a configuration element connected to a selected one of said M processing units by means of the internal bus dedicated to said selected processing unit, said configuration element being provided for generating, under control of said selected processing unit, said address ranges indicating said secured memory parts assigned to each of said M processing units, said memory access control member comprises a memory protection member connected via their dedicated internal bus to each of said N-M processing units, said configuration element having an output connected to said memory protection member for supplying said generated address ranges. The fact that the configuration element is connected to the selected processing unit by means of its internal bus, implies that only that selected processing unit can access the configuration element. In such a manner there is prevented that the set configuration could be changed by another processing unit than the selected one. Since the secured memory address ranges are determined under control of the selected processing unit, only the latter can change the set configuration. Furthermore the fact that the memory protection member is connected to the N-M processing units by means of their internal bus, implies that no access to the configuration element is possible by means of this N-M processing units, as there is no bus link to this configuration element.

A first preferred embodiment of an electronic data processing device according to the invention is characterised in that said memory protection member comprises a set of N-M memory protection units, to each of said N-M processing units there being assigned one of said memory protection units. In such a manner, each of the N-M processing units has its own memory protection units and the protected parts are efficiently protected.

A second preferred embodiment of an electronic data processing device according to the invention is characterised in that said memory protection member comprises a flag generator provided for generating a flag signal upon said detection, said flag generator being provided for supplying said flag to the processing unit to which the detected memory address is assigned. The use of a flag enables the secured processor to be alerted of an unauthorised access and to take appropriate measures.

The invention will now be described in more details with reference to the annexed drawings illustrating a preferred embodiment of a data processing device according to the present invention. In particular the invention will be described with reference to a data transfer terminal. However the invention is not limited to such terminals and can be applied on any data processing device. In the drawings:

Figure 1:
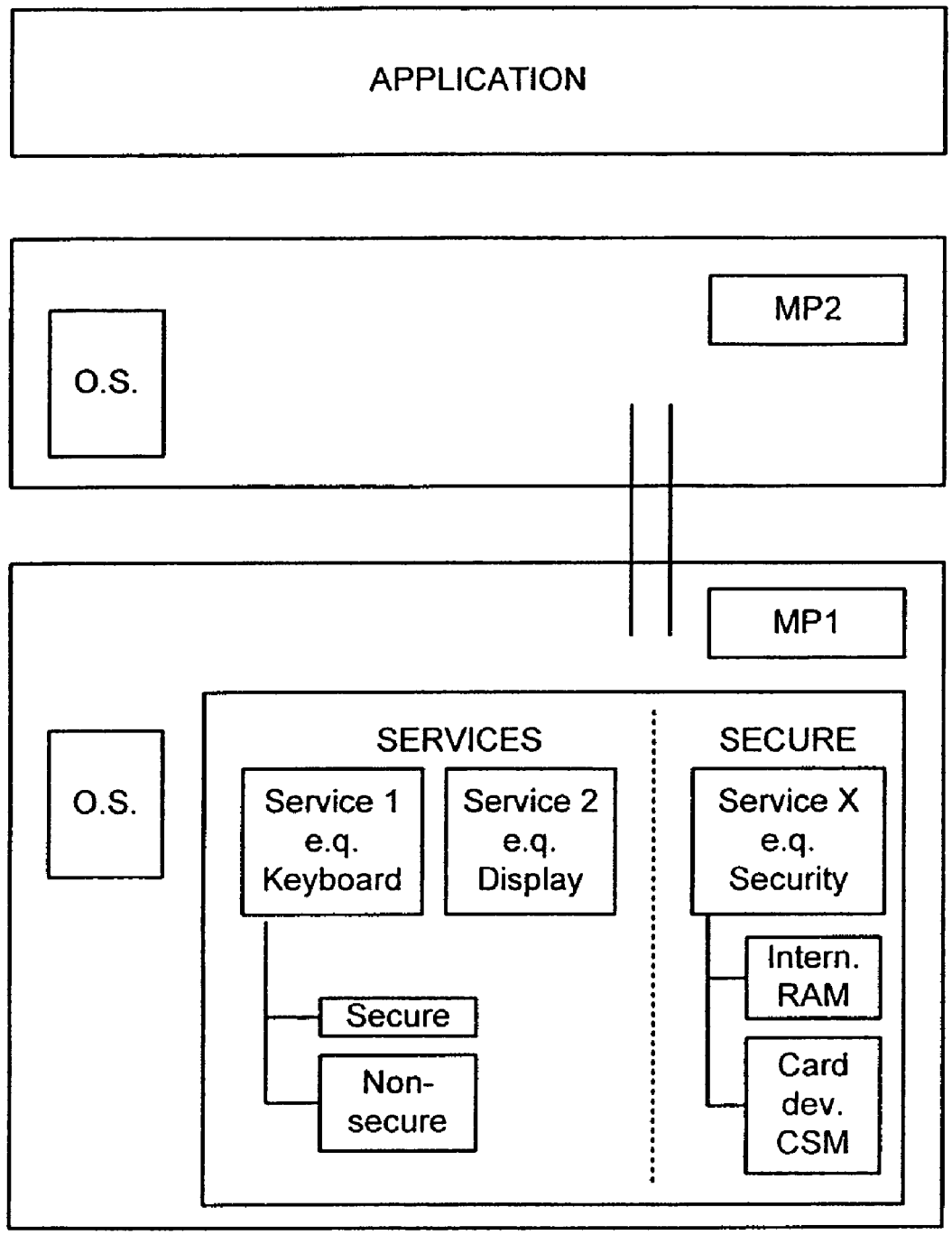
FIG. 1 shows an overall view of the architecture and data flow of an electronic data processing device according to the present invention.

In the drawings a same reference sign has been assigned to a same or an analogous element.

DETAILED DESCRIPTION

It is of the utmost importance that an electronic data processing device, such as an ATM (Automatic Teller Machines) or a POS (Point of Sales Terminal), is very well protected against any unauthorised access to the data processed by the terminal. Therefore measures are taken to protect and isolate not only the processing member but also the memory and the bus connecting the memory, the processing member and the access peripherals. For this purpose, the electronic data processing device according to the present invention comprises a data processing member having N (N≧2) processing units. In the example illustrated in FIG. 1, the processing member comprises two processing units (N=2) MP1 and MP2. Preferably, all N processing units are embedded in a single semiconductor element, thereby avoiding to physically isolate them as discrete physical components. Indeed, if all N processing units are embedded in a same semiconductor element, a majority of the data transfer remains within the semiconductor element and is not easily accessible from outside.

Among those N processing units M (M≦N−1) are provided to process secured operations and at least one of the remaining N-M processing units are provided for processing application data such as the generation of messages addressed to a user of a point-of-sales terminal. Under secured operations there is understood operations dealing with secured data such as the PIN code of a user, his bank account number, which is generally present in a first memory incorporated in a carrier such as a bank card, the encoding and decoding keys etc.. Under application data there is understood, data such as the user guidance, choice of language, information such as "do you want a ticket?" etc., which is not vulnerable and generally of no interest to an unauthorised user.

The presence of more than one processing unit makes it not only possible to split the processing power over more than one processing unit, but also to make a separation between the treatment of secured and non-secured data. In such a manner, the secured data is not mixed up, during processing, with the non-secured data, thereby avoiding that an unauthorised user could get access to the secured data via the application data. As shown in FIG. 1, each processing unit MP1 and MP2 has its own operating system OS enabling the respective processing unit to operate on its own.

It is however not enough to provide N distinct processing units and attribute the secure operations to M of the N processing units. It is also necessary to secure the second memory to which the processing units have access in order to avoid that an unauthorised user could retrieve secured data from the second memory. Data, such as encoding and decoding keys, transfer protocols, user data, processing algorithms etc. which are necessary for enabling an electronic data transfer operation, comprising secured data are stored in this second memory. In particular the secured data such as the encoding and decoding keys should not be accessible to an unauthorised user. One possibility would be to physically attribute a separate memory to each processor unit in order to avoid that one processor could read or write data in the memory attributed to another of the M processing units. Although this solution could be used, it is not a practical one as it does not offer a possibility to the N processing units to share at least a part of the memory in common thereby enhancing the efficiency. The solution to use a memory, which is shared by all N processing units, is therefore preferred, thereby enabling to configure this second memory in such a manner as to delimit at least one secured memory part within this second memory.

In order to realise such a delimitation, there is assigned to each secured memory part a dedicated address range. The configuration of each address range is preferably realised by using a number of registers, which are part of the memory access controller. The memory itself is divided in blocks, each block having a fixed predetermined size of for example 4 kbytes. To each of the M processing units there is thus each time assigned one or more memory blocks. In order to recognise at which address the assigned block or blocks start(s), a start address (SA) register is provided for storing the start addresses of each of the M processing units. The start address is the reference initial address, which configures the memory block or blocks to be protected.

It should be noted that the effective available physical memory space could be smaller than the total addressing capacity of the address generator and the start register so that virtual addressing can be used. In such a manner the logical address range (LS) of the memory blocks, which have to be protected, and the physical size of the memory storage area should not be necessarily the same. If the physical memory storage area (DS) is smaller than the logical address range (LS) of the start address register, then a same physical memory cell can be addressed n times with a same logical address, where n=LS/DS. If n≠1, care should be taken that the protected blocks cannot be reached by a multiple of the start address. For this purpose the memory address controller comprises also a mask register, which enables to configure the bits in the start address, which are not relevant.

In order to determine how many memory blocks there have been assigned to each of the processing units, the memory access controller is provided with a length register, which stores the number (NB) of blocks attributed to each of the M processing units. If, as set out here before n≠1, this should be taken into account when assigning the number of blocks. So, for example if n=2, then each attributed block in fact corresponds to half of the effective available memory space.

The memory access controller further comprises a programmable type register, which enables the configuration of the type of protection to be applied, as well as other features such as access speed and connected devices. Those types are read/write, read only, write only or no protection at all. The reset value is preferably always read/write protected.

A protected address range can thus be expressed as follows $(SA+m \times DS) \leq$ address to be protected $\leq (SA+m \times DS+NB \times BS)$ where BS is the block size and $1 \leq m \leq n-1$ (SA being the start address, DS the storage area size and NB the number of blocks attributed to each of the M processing units). It is furthermore of importance to provide a set of reset values in such a manner as to enable a restart in case of erasure. The following reset values could for example be applied (the presented number is in hexadecimal representation):
BS=0x1000 (4 kB)
>DS=0x800000
>PA=0x40000000
>LS=0x4000000
>SA=0x40400000 (physical address start+½ smallest device size->
>0x40000000+½*8 MB)
>NB=0x400 (½ smallest device size/BS->½*8 MB/4 kB)
>n=64 MB/8 MB=8
>
>Protected area is the sum of the following regions:
>0x40400000–0x40800000(with m=0)
>0x40C00000–0x41000000(with m=1)
>0x41400000–0x41800000(with m=2)
>0x41C00000–0x42000000(with m=3)
>0x42400000–0x42800000(with m=4)
>0x42C00000–0x43000000(with m=5)
>0x43400000–0x43800000(with m=6)
>0x43C00000–0x44000000(with m=7)

Figure 2:
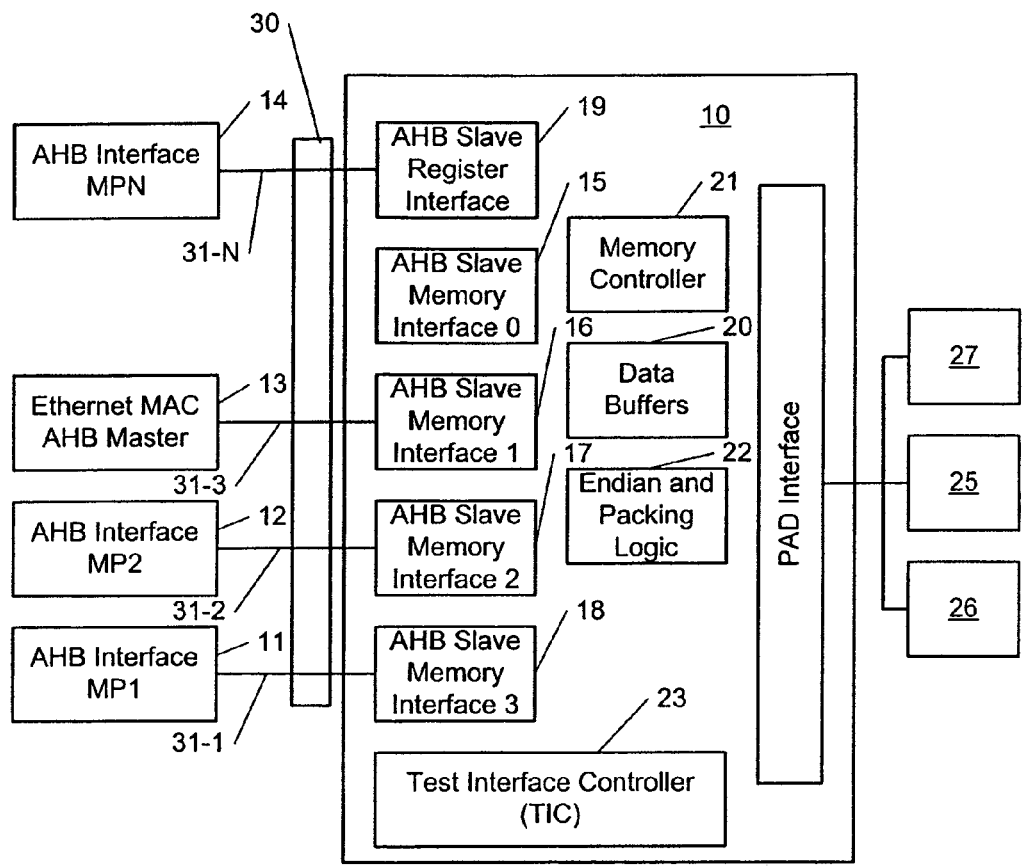
FIG. 2 shows a multi-port memory controller which is part of the device according to the present invention.

In order to manage this memory access, the electronic data processing device comprises a multi-port memory access controller 10, as illustrated in FIG. 2. The multi-port memory access controller is formed by an interface, which is shared by each of the N processing units (MP1, MP2, ... MPN) (11, 12, 14) as well as by other units such as for example an Ethernet Media Access Controller 13. Each processing unit (MP1, MP2, ... MPN) (11, 12, 14) and the Ethernet Media Access Controller 13 is connected to the multi-port memory access controller 10 by its own internal bus 31-1, 31-2, 31-N and 31-E. The multi-port memory access controller acts as a slave vis-a-vis the master, formed by the processing units and the Ethernet MAC.

The multi-port memory access controller further comprises a number of slave interfaces 15, 16, 17, 18 and 19 in such a manner that each of the N processing units and the Ethernet MAC each have a dedicated slave interface to which they are connected via their internal bus. The slave interfaces enable the programming of the memory access controller. They contain most of the registers and perform a large part of the register address decoding. The slave interfaces are prioritised with interface 15 having the highest priority. The presence of a plurality of slave interfaces enables high bandwidth peripherals to have direct access to the dynamic memories without data having to pass over the main system bus. The interface 19 forms the programmable type register mentioned here before.

Furthermore the memory access controller is provided with logic circuitry (20, 21, 22, 23) as well as with an interface 24. This logic circuitry comprises data buffers 20 for improving the memory bandwidth and reduce transaction latency. The buffers are not tied to a particular one of the slave interfaces and are used as read buffers, write buffers or a combination of both. The buffers are designed in such a manner that they are always coherent for read and write operations.

The logic circuitry also comprises a memory controller 21 for storing properties of the annexed memory such as for example the access speed, the type of memory, the memory bus speed. Circuitry 23 is formed by an Endian and Packing logic and is provided for applying little-endian and big-endian conversion and data packing. Circuitry 23 is formed by a test interface controller used for testing the controller after manufacturing.

The configuration of this multi-port memory access controller is realised by one of the N-M (MP1;14) processing units provided for processing application data. In such a manner, a large flexibility is obtained. Preferably, the memory access controller controls the access to dynamic memory interfaces and asynchronous static memories. It is also designed to operate with cached and non cached processors and is equipped with read and write buffers (20) to reduce latency and improve performances, in particular for non cached processors. Furthermore, the memory access controller comprises a plurality of advanced high speed busses for accessing the second memory.

The memory access controller supports a boot device enabling a configuration of the whole memory and which has the ability to access the second memory in read mode. This part of the second memory comprises preferably a NOR-flash (25) memory, for example a 4 Mbit memory organised as a 512K×16 bits. A global random access read/write part of the second memory is provided for storing code and data, which should be accessed in a fast way access and offers a high density for a moderate cost. This part is preferably formed by an SDRAM (26; typical SDRAM of 128 or 256 Mbit, organized as 8M×16 or 16M×16). Finally the memory comprises a high density nonvolatile part provided for building a reliable file system. This part is preferably formed by a NAND-Flash 27 of for example 128 Mbits.

The memory part 26 (SDRAM) is accessible to all N processing units. The multi-port memory access controller makes no distinction between memory access requested by the different processing units. However, as already described, a dedicated area of the common SDRAM 26 is reserved for use by the M processing units, which deal with secured data. In this dedicated area, codes and data necessary for the secure operations, handled by the M processing units, are stored. This dedicated area must be protected against access by the NM processing units and the Ethernet MAC. For this purpose the multi-port memory access controller comprises a memory access control member 30 provided for storing the address ranges assigned to the M processing units as illustrated in FIG. 3.

The memory access control member 30 initiates a mechanism for preventing access by the N-M processing units or the Ethernet MAC to a configurable number of contiguous segments of the memory. This allows delimiting of the memory range whose access can be reserved to the M secure processing units. The restricted area may be locked for read, write or both from the N-M point of view. The restricted area can be mirrored throughout the memory space when using memory devices that don't use all available address bits. The memory access control member 30 comprises a memory protection member formed for example by a set of N-M memory protection units (32-1, 32-2, 32-3) in such a manner that to each of said N-M processing units and to the Ethernet MAC, there is assigned one of said memory protection units. Each of the N-M processing units and the Ethernet MAC is connected to its memory protection unit by means of its dedicated internal bus 31.

Figure 3:
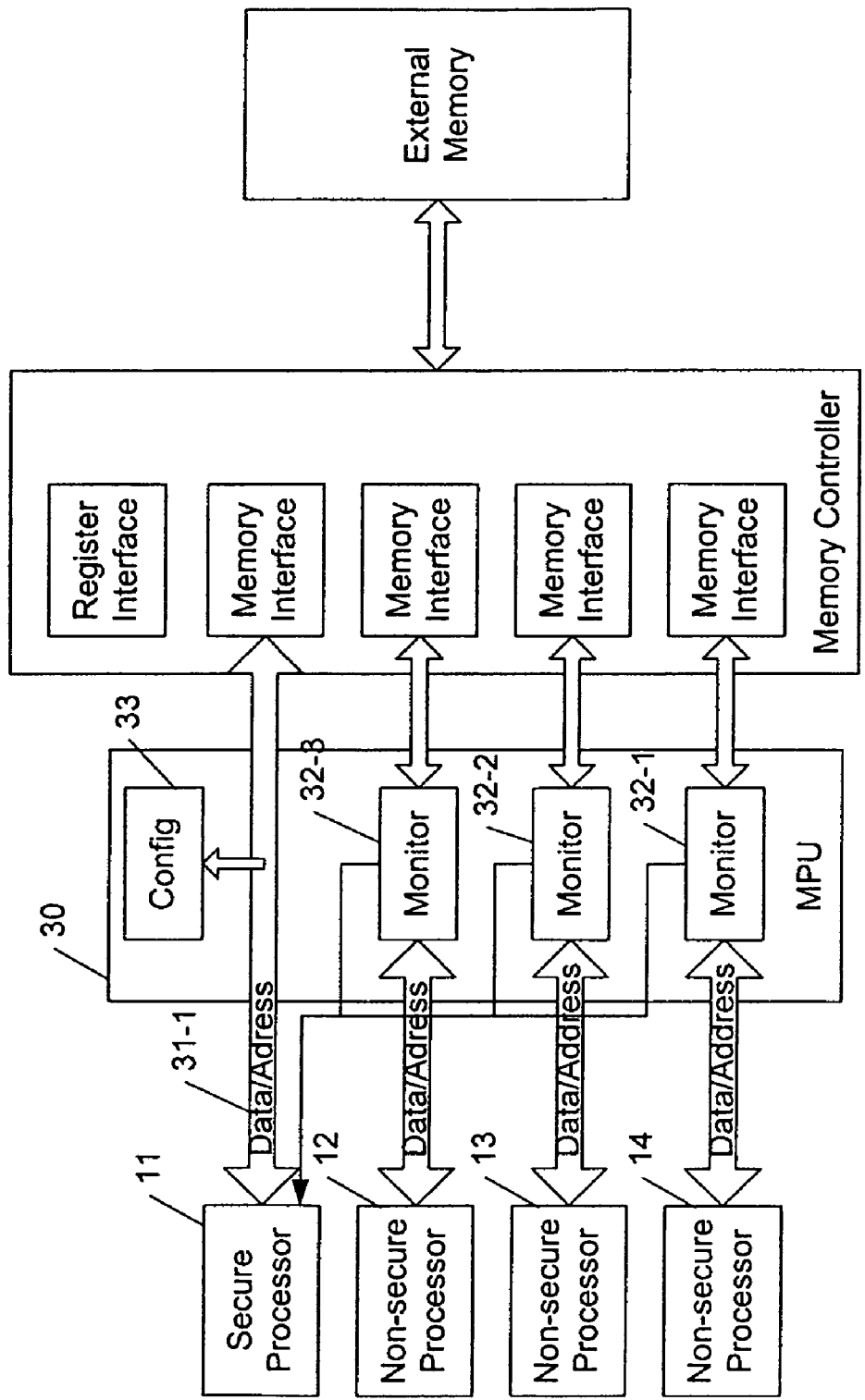
FIG. 3 illustrates the memory access mechanism.

The configuration of each of the memory protection units 32 is controlled by a selected one of the M secure processors, for example processor 11 as illustrated in FIG. 3. For this purpose the memory access control member 30 comprises a configuration element 33, which is connected to the internal bus 31-1 of the secure processor 11. There is no connection between this configuration element and the other internal buses, so that there is no direct physical access to this configuration element by means of the other processors. Consequently the set configuration cannot be changed neither reset by anyone of the N-M non-protected processors, as they have no access to this configuration element, even not by having a full knowledge of the internal architecture of the device. Only an external or power-on reset may reset the set configuration. In a default programming, after reset, the first 4 Mbyte of SDRAM is free for both read and write, the next 4 Mbyte is locked for read and write. This sequence is repeated for the whole physical range of the first SDRAM device (64 Mbyte). When using e.g. a 16 Mbyte SDRAM device (128 Mbit), this can be divided into 4 blocks of 4 Mbyte, the $1^{st}$ and the $3^{rd}$ will be available for MP2, the $2^{nd}$ and the $4^{th}$ will be locked.

Once the configuration of the protected memory address ranges has been set, i.e. the protected address ranges have been assigned to each of the M processing units, this configuration is supplied via an output of the configuration element to the memory protection units 32 in order to inform the latter of the set configuration.

If now one of the N-M processing units, suppose MP2 (12), would like to access a memory part dedicated to processing unit MP1 (11), the memory protection unit 32-3 will recognise the address assigned to MP1 and will overrule the address. This is realised by using the start 25 address and the block size stored in the start address register and the length register. Depending on the type of protection as set in the protection type register, the access will be enabled or the memory protection unit will overrule the access, for example by converting the presented address to a predetermined address corresponding to no location in SDRAM.

When one of the N-M processing units or the Ethernet MAC attempts to access the memory part, assigned to the M processing units, preferably a flag signal FIQ is generated by a flag generator, which is part of the memory control member. The flag signal is supplied to the processing unit to which the detected address had been assigned as well as to the processing unit, which tried to access the protected memory part. The processing unit MP1, which received the flag signal could treat this as a tamper source and initiate a tamper routine. This condition should normally not occur unless an attempt is made to retrieve some secure information, a software buffer overflow or bad pointer usage should be trapped by the memory management unit of the processor and cause a 'Data Abort' exception.

The configuration of all the memory protection units is preferably common, they share the same configuration information but it consists of multiple instantiations of the same function since it consists of multiple buses and since there is no physical connection between the internal buses, multiple instantiations are needed.

The invention claimed is:

1. An electronic data processing device, comprising a data processing member, provided for processing first encoded data, obtained by encoding first data, input by a user and second encoded data, read from a carrier comprising a first memory for storing identification data, said data processing member being provided for controlling, based on said first and second data, a secured operation initiated by said user, said device further comprising a second memory accessible by said processing member, said second memory being configurable in order to delimit at least one secured memory part within said second memory, to each of said secured memory parts there being assigned a dedicated address range, said data processing member comprises N (N≧2) processing units of which M (M≦N−1) processing units are provided to process said secured operation and at least one of the remaining N-M processing units is provided for processing application data related to said operation, to each of said M processing units there is assigned at least one of said secured memory parts, each of said N processing units being each connected to a memory access control member, said second memory being also connected to said memory access control member, which is provided for controlling accesses to said second memory, said memory access control member being provided for storing memory address ranges assigned to said M processing units and for detecting an access request to a protected memory address, belonging to said ranges, when issued by one of said N-M processing units and for overruling a detected access request to said protected memory address, characterised in that each of said processing units being each connected to said memory access control member by means of a dedicated internal bus and in that said memory access control member comprises a configuration element connected to a selected one of said M processing units by means of the internal bus dedicated to said selected processing unit, said configuration element being provided for generating, under control of said selected processing unit, said address ranges indicating said secured memory parts assigned to each of said M processing units, said memory access control member comprises a memory protection member connected via their dedicated internal buses to each of said N-M processing units, said configuration element having an output connected to said memory protection member for supplying generated address ranges.

2. An electronic data processing device as claimed in claim 1, characterised in that said memory protection member comprises a set of N-M memory protection units, to each of said N-M processing units there being assigned one of said set of N-M memory protection units.

3. An electronic data processing device as claim in claim 2, characterised in that each of said set of N-M memory protection units is connected to its respective processing unit by means of its dedicated internal bus.

4. An electronic data processing device as claim in claim 1, characterised in that said memory protection member comprises a flag generator provided for generating a flag signal upon detection of said access request, said flag generator being provided for supplying said flag to the processing unit to which the protected memory address is assigned.

5. An electronic data processing device as claim in claim 4, characterised in that said flag generator is provided for supplying said flag to the processing unit, which supplied the detected access request.

6. An electronic data processing device as claim in claim 1 characterised in that said N processing units are housed in a single semiconductor.

* * * * *